United States Patent [19]

Dray

[11] Patent Number: 4,723,847

[45] Date of Patent: Feb. 9, 1988

[54] APPARATUS FOR VARYING PRESSURE WITHIN A SCREW CHANNEL

[76] Inventor: Robert F. Dray, Box 273-M, Rte. 1, Hamilton, Tex. 76531

[21] Appl. No.: 15,665

[22] Filed: Feb. 17, 1987

[51] Int. Cl.$^4$ .............................................. B29B 1/06
[52] U.S. Cl. ..................................... 366/81; 366/319; 425/207
[58] Field of Search ........................ 366/79, 80, 81, 82, 366/87, 90, 83, 84, 85, 319, 324; 425/192 R, 207, 208, 149

[56] References Cited

U.S. PATENT DOCUMENTS

| | | | |
|---|---|---|---|
| 3,856,278 | 12/1974 | Eisenmann | 425/209 |
| 3,924,842 | 12/1975 | Klein | 366/79 |
| 4,213,710 | 7/1980 | Hold | 366/81 |
| 4,387,997 | 6/1983 | Klein | 425/208 |
| 4,444,507 | 4/1984 | Dray | 366/81 |
| 4,491,417 | 1/1985 | Hold | 366/75 |

*Primary Examiner*—Robert W. Jenkins
*Attorney, Agent, or Firm*—Gamble, Verterano, Mojock, Piccione & Green

[57] ABSTRACT

This invention relates to apparatus for continuously varying the pressure within a screw channel of a plasticating machine by way of a variable restriction in the screw channel. The apparatus includes a cylindrical barrel, a shaft rotatable within said barrel having a substantially circular cross-section and a longitudinal axis for rotation concentric with the barrel. The shaft is provided with a helical screw channel which is defined between successive turns of at least one helical flight integrally formed with the shaft. At least one radially movable first member is disposed at a right angle to said axis within the channel at a location along the axis and is located within the channel at a location along the axis at which the material being processed is substantially melted. A reciprocatively movable second member is disposed within a cylindrical bore through said shaft along the axis of rotation, the second member having a conical end portion which cooperates with an inner end of said first member such that said first member is movable in a radially inward or outward direction in response to the reciprocating movement of the second member. The inward or outward location of the first member provides a continuously variable restriction in the screw channel which increases or decreases pressure in an upstream direction within the channel.

5 Claims, 7 Drawing Figures

APPARATUS FOR VARYING PRESSURE WITHIN A SCREW CHANNEL

This invention relates to apparatus for controlling pressure within a screw channel.

More specifically, this invention relates to apparatus for continuously varying the pressure within a screw channel of a plasticating machine by way of a variable restriction in the screw channel. The apparatus includes a cylindrical barrel, a shaft rotatable within said barrel having a substantially circular cross-section and a longitudinal axis for rotation concentric with the barrel. The shaft is provided with a helical screw channel which is defined between successive turns of at least one helical flight integrally formed with the shaft. At least one radially movable first member is disposed at a right angle to said axis within the channel at a location along the axis at which the material to be processed is substantially melted. A reciprocatively movable second member is disposed within a cylindrical bore through said shaft along the axis of rotation, said second member having a conical end portion which co-operates with an inner end of said first member such that the first member is movable in a radially inward or outward direction in response to the reciprocating movement of the second member. The inward or outward location of the first member provides a continuously variable restriction in the screw channel which increases or decreases pressure in an upstream direction within the channel.

Different materials require different temperature and pressure profiles during the plasticating operation. In the prior art, a screw is machined or "cut" for a specific type of material such that the pressure developed within the screw channel is optimized to the extent possible for that particular material. However, the screw tends to become quite specific; and thus, a screw designed and configured for high density polyethylene may not necessarily be used successfully on polypropylene for the reason that the pressure variance and viscosity and shear effects experienced by one material may be unacceptable for processing a different material. The prior art discloses several "barrier" type screws which present a restriction in the screw channel over which the material must pass as it is being conveyed. These are primarily intended to expose the material to high shear rates or to force material into a secondary channel for further processing or conveying. The prior art also shows several attempts to provide adjustments to the configuration of these restrictions. An example may be seen in a patent to Hold, et al., U.S. Pat. No. 4,213,710 which provides plurality of adjustable dams arranged across the screw channel. The dams are adjusted by removing bolts securing them and adding a series of shims, which requires access ports through the barrel of the machine or removal of the screw. Similarily, another patent to Hold, et al., U.S. Pat. No. 4,491,417 teaches the use of barriers which extend through openings in the barrel of the machine and may be adjusted radially to vary the clearance between the inner end of the barrier and the surface of the rotor.

A disadvantage of the prior art is that the screw must be removed from the machine in order to alter its configuration and pressure profile. In a larger machine, this becomes quite cumbersome. A producer of plastic materials would have a great advantage if it were able to alter the pressure profile of the screw by way of an external adjustment in the vicinity of the shank end of the screw which is accessable without removing the screw from the barrel of the machine without the need to shut down the machine, make the necessary adjustments and re-start the machine.

The invention to be described more fully hereinafter remedies the shortcomings of the prior art; and in addition, provides features and advantages not appearing therein.

It is, therefore, a primary object of the invention to provide apparatus for varying the pressure within a screw channel so that the pressure profile may be optimized for the particular type of material being processed.

Another object of the invention is to provide a continuous range of adjustment for such a pressure profile.

Yet another object of the invention is to provide a means external to said screw for providing the adjustment.

Still another object of the invention is to provide means for adjusting the pressure profile within a screw without the necessity of removing the screw from the barrel of the machine or the necessity of installing access ports within the barrel.

Still another object of the invention is to provide a means for making such adjustment with standard tools in a minimum amount of time.

SUMMARY OF THE INVENTION

In the fulfillment of the foregoing objects, the present invention provides apparatus as disclosed for continuously varying the pressure over a predetermined range within a screw channel. In a plasticating machine of the type having a cylindrical barrel, there is provided a shaft which has longitudinal axis concentric therewith about which the shaft is rotatable within the barrel. A helical flight is formed integrally with shaft, the flight and the shaft defining a helical channel for melting and conveying plasticating material in a downstream direction. The flight has a pushing side orientated in a downstream direction from a trailing side. A radially movable first member which has an approximate "T" configuration is disposed radially with respect to the longitudinal axis across the channel and is located within an opening in the shaft at a point where substantial melting has occurred. A reciprocatively movable second member is disposed within a bore inside the screw along the longtitudinal axis. The member has a conical end portion which co-operates with an inner end of the radially movable pin and also has a male threaded portion at an opposite end thereof which is engagable with a female threaded portion secured to a drive sleeve of the machine. The second member can be reciprocatively moved within the bore when the threaded portion of the second member is rotated a predetermined amount. As the second member is rotated, the male threads engaged with the female threaded portion of the drive sleeve cause the second member to move longitudinally within the screw. The end of the first member which communicates with the conical end portion of the second member moves radially inward and outward in response to the reciprocating movement of the member. As the first member extends into the channel, it presents a restriction which increases the pressure within the channel. Conversely, as the first member recedes from the channel, it presents less of a restriction and the pressure within the channel is decreased.

DESCRIPTION OF THE DRAWINGS

Other objects and advantages of the present invention will be apparent from the ensuing description and the illustrative embodiment thereof in the course of which reference is made to the accompaning drawings in which.

DESCRIPTION OF THE PREFERRED EMBODIMENT

Figure 1:
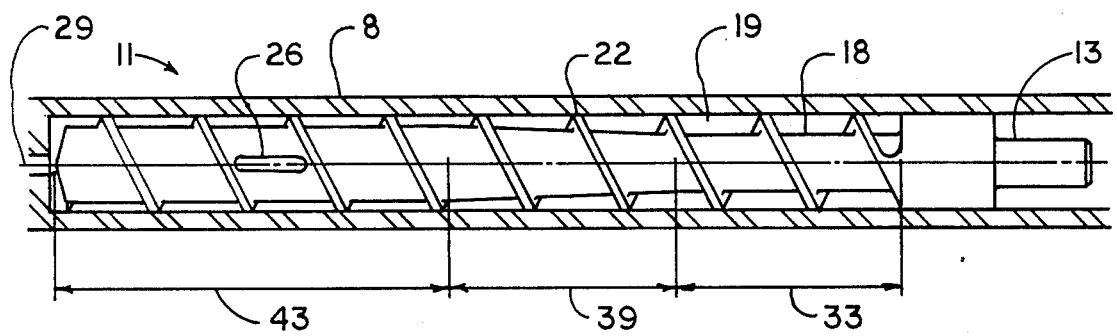
FIG. 1 is an elevational view of a plasticating screw embodying the invention.
Figure 7:
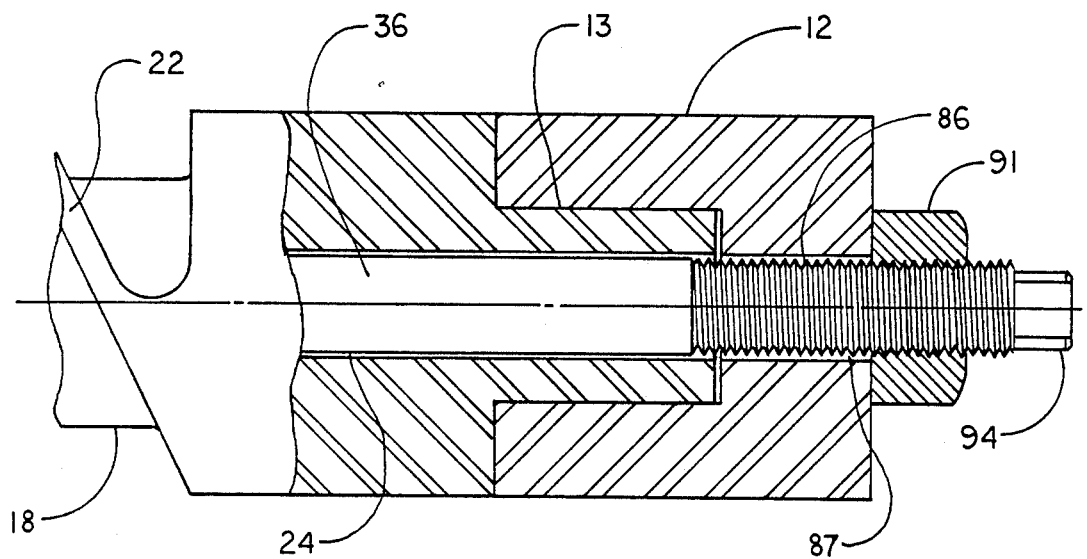
FIG. 7 is a sectional view of a shank end portion of a screw embodying the invention.

Reference is now made to FIG. 1 of the drawings which depicts a plasticizing screw generally indicated by reference numbeal 11. Screw 11 includes shaft 18 which has a generally circular cross section and which is able to rotate in cylindrical barrel 8 about a longitudinal axis 29 with which shaft 18 is concentric. Shaft 18 is provided with a helical flight indicated by reference numeral 22 and as may be seen in FIG. 1, the diameter of shaft 18 varies along longitudinal axis 29. Those skilled in the art will recognize that the particular screw identified by reference numeral 11 is divided into distinct sections commonly found in plasticizing screws, and FIG. 1 discloses a feed section for solids conveying designated by reference numeral 33, a metering section designated by reference numeral 43 for conveying melted materials and a transition section 39 wherein the diameter of shaft 18 varies along axis 29. Material enters channel 19 at the beginning of feed section 33. For purposes of illustration, the drive mechanism normally associated with this portion of the screw is not shown; although drive sleeve 12 which shank end 13 of screw 11 is attached is shown in FIG. 7.

Figure 2:
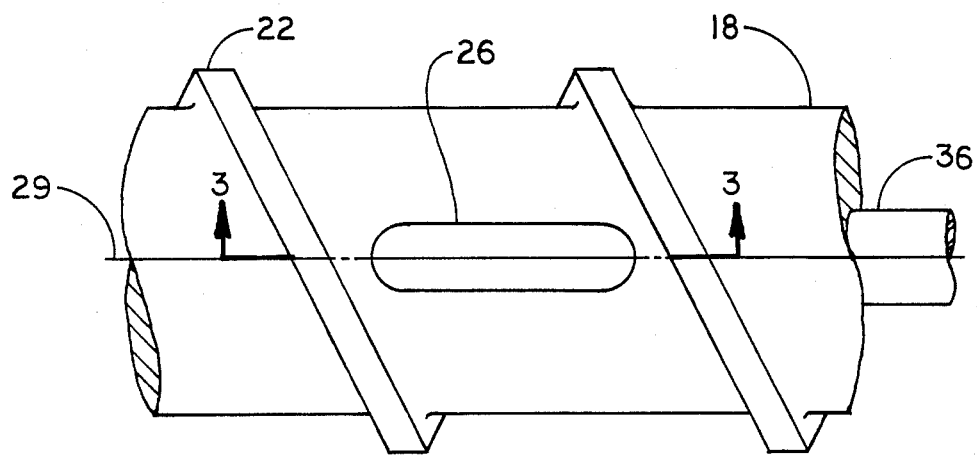
FIG. 2 is a detail elevational view of the invention.

Referring now to FIG. 2, first member 26 is shown as being located at a predetermined distance along channel 19 at a location where substantial melting has occurred, and for this discussion first member 26 will be illustrated in the metering section 43 of screw 11. First member 26 is disposed approximately parallel to longitudinal axis 29 across channel 19 and has the general appearance of a standard key. As may be seen in FIG. 3, which is a section along lines 3—3 of FIG. 2, first member 26 has an approximate "T" shape and includes end 38 disposed at a right angle to the portion of first member 26 which extends into channel 19. First member 26 is slidably movable in an opening 31 in shaft 18 which opening 31 is so fabricated so as to accept first member 26 and permit first member 26 to move in a radically inward or outward direction relative to longitudinal axis 29. The inward and outward radial direction of movement of first member 26 is indicated by reference numeral 46 on FIG. 3. End 38 of first member 26 extends into a cylindrical bore 24 within shaft 18. Bore 24 is concentric with longitudinal axis 29 and extends from shank end 13 of screw 11 into the general vicinity of metering section 43 a sufficient distance to allow the relative movement between first member 26 and the other components to be hereinafter described.

Disposed within bore 24 in a longitudinal direction, and slidably moveable within bore 24, is a second member 36, which is cylindrical in cross-section and has a conical end portion 41. End 38 of first member 26 bears against conical end portion 41 of second member 36 such that conical end portion 41 and end portion 38 are always in contact. Second member 36 is able to move in a longitudinal upstream and downstream direction as indicated by reference numeral 51. End 38 of first member 26 is configured so as to slide relative to conical end portion 41, and as may be seen by referring to FIG. 3, as second member 36 moves in a longitudinal direction, first member 26 moves radially inwardly and outwardly in response thereto so as to extend from opening 31 into channel 19 or retract into opening 31. By way of an example, if a general downstream is indicated by reference numeral 53, when second member 36 moves in a downstream direction, first member 26 will be forced in a radially outward direction from opening 31 into channel 19 as viewed in FIG. 3.

Figure 4:
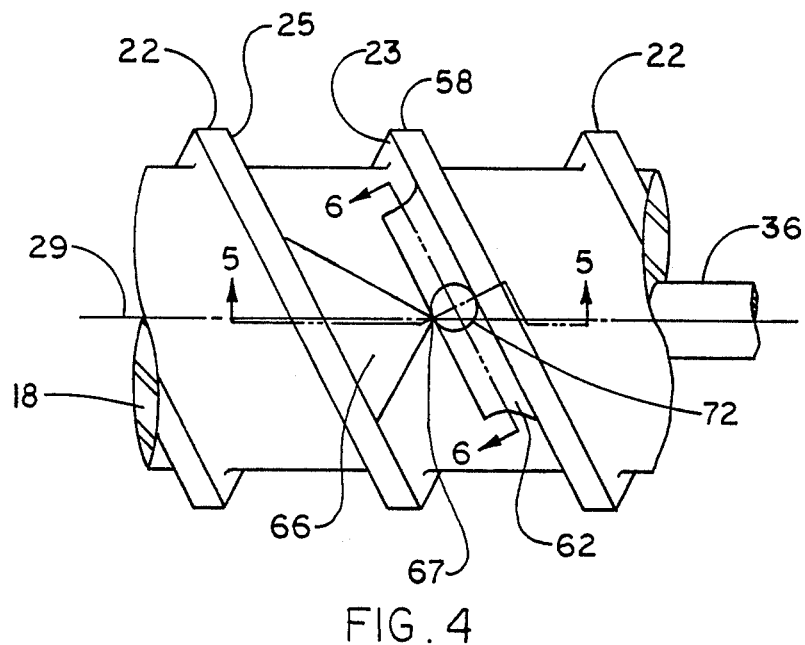
FIG. 4 is a detail of elevational view of an alternative embodiment of the invention.
Figure 5:
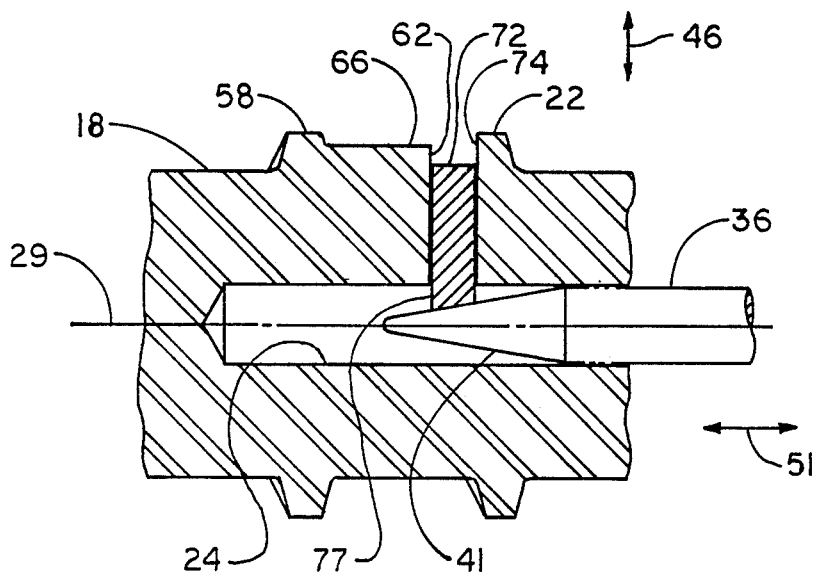
FIG. 5 is a sectional view along lines 5—5 of FIG. 4.
Figure 6:
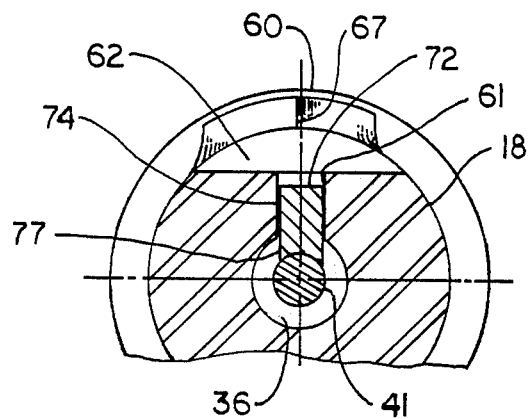
FIG. 6 is a sectional view along lines 6—6 of FIG. 4.

Referring now to FIGS. 4, 5, and 6, an alternate embodiment of the invention is disclosed. A prior U.S. patent to Robert F. Dray, U.S. Pat. No. 4,444,507 teaches the use of a triangular diverting means within a screw channel, frequently formed by two parallel helical flights which diverting means co-operates with a groove in the shaft of the screw disposed along a pushing side 23 of a flight. As may be seen in FIG. 4, diverting means 66 extends partially across screw channel 19 from trailing side 25 of flight 22. In addition groove 62 is disposed along pushing side 23 of flight 22 such that apex 67 of diverting means 66 is in the vicinity of deepest portion 61 of groove 62 as may be seen in FIGS. 4 and 6. Within the deepest portion 61 of groove 62 is disposed pin 72 which is shown as being circular in cross section and extends through a circular hole 74 in shaft 18. End 77 of pin 72 extends into bore 24. Pin 72 is able to slide inwardly and outwardly in hole 74 in a radial direction 46 in a manner similar to first member 26 as previously discussed. In an identical manner, second member 36 is disposed within bore 24 and likewise has conical end portion 41. Conical portion 41 bears against end 77 of pin 72 such that when second member 36 is moved longitudinally within bore 24, pin 72 moves radially inwardly and outwardly in response thereto.

Figure 3:
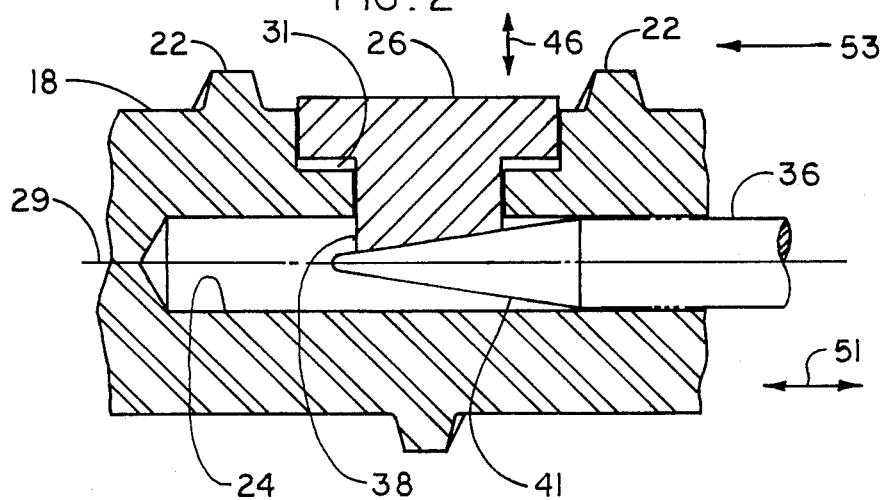
FIG. 3 is a sectional view along lines 3—3 of FIG. 2.

Referring now to FIG. 7, to provide for the longitudinal movement of second member 36, drive sleeve 12, which encloses shank end 13 of screw 11 is provided with female threaded portion 91 which is secured to drive sleeve 12 and has female threads as shown which are engageable with a threaded portion 86 of second member 36. Female portion 91 is fixed with respect to the reciprocating movement of second member 36 in an upstream or downstream direction. While female portion 91 can rotate with drive sleeve 12 and second member 36, it remains fixed with respect to any longitudinal movement of second member 36. Second member 36 has threaded portion 86 which extends through opening 87 in drive sleeve 12 and the threads of threaded portion 86 are engaged with the threads of female portion 91. When second member 36 is rotated, it is able to advance into a recede from bore 24 depending on the direction of rotation and whether threaded portion 86 and matching female portion 91 are provided with left hand or right hand threads. Flat 94 is formed on threaded portion 86 so that threaded portion 86 and second member 36 can easily be rotated with standard shop tools such as an open end wrench. FIG. 7, it should be noted, discloses the same configuration for controlling the movement of second member 36 regardless whether the invention is configured as shown in FIGS. 2 and 3 or in FIGS. 4 or 5.

OPERATION

When the invention disclosed is placed in operation, flat 94 is rotated a predetermined amount which causes second member 36 to move a corresponding amount within bore 24. As second member 36 and its conical end portion 41 move within bore 24, first member 26 or pin 72, depending on the configuration selected, moves in a radial direction inwardly or outwardly in channel 19. If, for example, it is desired that the pressure within channel 19 be increased, flat 94 would be rotated so that second member 36 advances downstream into bore 24. This downstream movement of conical end portion 41 urges either first member 26 or pin 72 in a radially direction out of opening 31 and into channel 19. As may be seen in FIG. 3, as first member 26 extends out into channel 19, it presents a restriction within channel 19 through which the melted material must pass which increases the pressure experienced by the material within channel 19. In the case of the alternate embodiment shown in FIGS. 4, 5, and 6, pin 72 would extend farther into groove 62 and present a restriction to the material as it is diverted into groove 62 by diverting means 66.

Conversly, if flat 94 is rotated in an opposite direction, second member 36 is withdrawn in an upstream direction from bore 24. The pressure of the material present within channel 19 urges end 38 of first member 26 or end 77 of pin 72 against conical end portion causing first member 26 or pin 72 to recede radially into opening 31 from channel 19. This presents less of a restriction in channel 19 and results in a reduction of pressure within channel 19. It should be noted that since second member 36 extends outside of the plasticating apparatus, it is quite easy to rotate flat 94 with common shop tools to make the necessary adjustments; and if desired, threaded portion 86 may be provided with calibrations corrsponding to the inward or outward radial movement of either first member 26 or pin 72 so that the aproximate location of first member 26 or pin 72 may be estimated.

Thus, it may be seen from the foregoing description that apparatus has been provided for varying the pressure within a screw channel so that the pressure gradient may be optimized for the particular type of material being processed. In addition, the adjustment may be made continuously because of the threaded adjustment provided in the shank portion of the screw. The necessity of removing the screw from the machine to adjust the devices intended to vary pressure as indicated or taught by the prior art has been overcome. The adjustment may be made with simple shop tools such as a wrench and can be performed in a very short time.

Although but one embodiment of the present invention has been illustrated and described, it should be apparent to those skilled in the art that various changes and modifications can be made to these embodiments without departing from the spirit and scope of the invention.

I claim:

1. Apparatus for melting and conveying plasticated material comprising:
   (a) a barrel having a longitudinal axis;
   (b) a shaft rotatable within said barrel and having a substantially circular cross-section, said shaft further having a cylindrical bore therethrough, said shaft and said bore being concentric with said axis;
   (c) a helical channel defined between successive turns of at least one helical flight formed integrally with said shaft;
   (d) at least one radially movable first member slidably disposed within an opening extending from said channel through said shaft to said bore, said first member being located in said channel at a predetermined point at which said material has substantially melted, said first member further having an inner end extending into said bore; and
   (e) a reciprocatively movable second member disposed within said bore, said second member having a conical end portion which bears against said inner end of said first member such that said first member is extendable from said opening in response a downstream movement of said second member, and retractable into said opening in response to an upstream movement of said second member.

2. The apparatus of claim 1 wherein said first member extends across said helical channel and is approximately parallel to said axis.

3. The apparatus of claim 2 wherein said second member is further provided with a male threaded portion at an end opposite to said conical end portion, said threaded portion being engagable with a female threaded means which is fixed relative to reciprocating movement of said second member, whereby said second member can be reciprocatively moved a predetermined distance within said bore of said shaft when said threaded portion of said second member is rotated through a corresponding angle.

4. An improved plasticizing screw of the type having a shaft and a longitudinal axis concentric with said shaft about which said shaft can rotate within a barrel, said screw having a helical flight formed integrally with said shaft, said flight and shaft defining a helical channel for melting and conveying plasticated material in a downstream direction, said flight having a pushing side oriented downstream from a trailing side thereof, said screw further having a cylindrical bore therethrough concentric with said axis and at least one groove in said shaft disposed along said pushing side of said flight in the vicinity of a metering section of said screw, which groove co-operates with a triangular diverting means having an apex and extending across a portion of said channel from a trailing side of a preceeding flight to a deepest portion of said groove, such that said apex is adjacent to said deepest portion of said groove wherein said improvement comprises:
   (a) a radially movable pin slidably disposed in an opening in said groove at said deepest portion thereof, said opening extending radially from said groove into said bore; and
   (b) a reciprocatively movable member slidably disposed within said bore, said member having a conical end portion which bears against and co-operates with an inner end of said pin such that said pin is extendable into said groove when said member moves in a downstream direction and recedes from said groove when said member moves in an upstream direction.

5. The apparatus of claim 4 wherein said member is further provided with a male threaded portion at an end opposite to said conical end portion, said threaded end portion being engagable with a female threaded means fixed relative to reciprocating movement of said member, whereby said member can be reciprocatively moved a predetermined distance within said bore when said threaded portion of said member is rotated through a corresponding angle.

* * * * *